United States Patent [19]

Stack et al.

[11] Patent Number: 5,803,330

[45] Date of Patent: Sep. 8, 1998

[54] SPORT RACK

[76] Inventors: Martin O. Stack, 12031 Vulcan Way, Richmond, British Columbia, Canada, V6V 1J7; Maximilian E. Burgess, 1 Maythorne Eastbourne Road, Blindley Heath, Lingfield, Surrey, TH7 7JN, United Kingdom

[21] Appl. No.: 369,121

[22] Filed: Jan. 3, 1995

[51] Int. Cl.⁶ ..................................................... B60R 9/00

[52] U.S. Cl. ........................... 224/518; 224/519; 224/534; 224/533

[58] Field of Search .................................... 224/518, 519, 224/520, 521, 534, 535, 533, 536

[56] References Cited

U.S. PATENT DOCUMENTS

| | | | |
|---|---|---|---|
| D. 294,564 | 3/1988 | Stoecker | D12/158 |
| D. 331,214 | 11/1992 | Johnson . | |
| D. 346,782 | 5/1994 | Schmidt | D12/162 |
| D. 346,995 | 5/1994 | Thulin | D12/408 |
| 4,022,362 | 5/1977 | Revercomb | 224/42.1 |
| 4,234,284 | 11/1980 | Hauff | 414/462 |
| 4,234,285 | 11/1980 | Martizez | 414/462 |
| 4,277,008 | 7/1981 | McCleary | 224/273 |
| 4,369,009 | 1/1983 | Fulford | 410/35 |
| 4,381,069 | 4/1983 | Kreck | 224/521 |
| 4,394,947 | 7/1983 | Tartaglia | 224/42.43 |
| 4,676,414 | 6/1987 | Deguevara | 224/42.03 |
| 4,856,686 | 8/1989 | Workentine | 224/42.07 |
| 4,938,399 | 7/1990 | Hull et al. | 224/42.43 |
| 4,938,400 | 7/1990 | Springston | 224/155 |
| 4,954,030 | 9/1990 | Szucs et al. | 410/96 |
| 5,025,932 | 6/1991 | Lay | 211/20 |
| 5,067,641 | 11/1991 | Johnson et al. | 224/42.03 |
| 5,094,373 | 3/1992 | Lovci | 224/42.08 |
| 5,106,002 | 4/1992 | Smith et al. | 224/42.03 |
| 5,108,018 | 4/1992 | Spinka | 224/42.03 |
| 5,129,559 | 7/1992 | Holliday | 224/42.03 |
| 5,169,042 | 12/1992 | Ching | 224/42.45 |
| 5,181,822 | 1/1993 | Allsop et al. | 414/462 |
| 5,190,195 | 3/1993 | Fullhart et al. | 224/42.03 |
| 5,219,105 | 6/1993 | Kravitz | 224/42.03 |
| 5,230,449 | 7/1993 | Collins et al. | 224/42.03 |
| 5,232,133 | 8/1993 | Speer | 224/500 |
| 5,244,133 | 9/1993 | Abbott et al. | 224/42.03 |
| 5,303,857 | 4/1994 | Hewson | 224/42.03 |
| 5,372,287 | 12/1994 | Deguevara | 224/535 |
| 5,373,978 | 12/1994 | Buttchen et al. | 224/521 |
| 5,443,189 | 8/1995 | Hirschfeld | 224/521 |
| 5,469,997 | 11/1995 | Carlson | 224/521 |

FOREIGN PATENT DOCUMENTS

| | | |
|---|---|---|
| 0 127 428 | 12/1984 | European Pat. Off. . |
| 0 128 088 | 12/1984 | European Pat. Off. . |
| 0 451 691 A2 | 10/1991 | European Pat. Off. . |
| 835488 | 12/1938 | France . |
| 2 507 553 | 12/1982 | France . |
| 92 05 121 | 12/1992 | Germany . |
| 405 091 | 7/1966 | Switzerland . |
| 251 422 | 5/1926 | United Kingdom . |
| 2 053 113 | 2/1981 | United Kingdom . |
| 2 101 547 | 1/1983 | United Kingdom . |
| 84/00931 | 3/1984 | WIPO . |
| WO 90/11205 | 10/1990 | WIPO . |
| 91/11344 | 8/1991 | WIPO . |
| WO 92/19470 | 11/1992 | WIPO . |
| WO 93/04895 | 3/1993 | WIPO . |
| WO 94/03346 | 2/1994 | WIPO . |

*Primary Examiner*—David J. Walczak
*Attorney, Agent, or Firm*—Antony C. Edwards

[57] ABSTRACT

An external rack for attachment to a vehicle has a base releasably mountable on a vehicle; a generally vertical member having upper and lower ends, the generally vertical member lockably, releasably mountable on the base at the lower end; a generally horizontal member releasably mountable to the generally vertical member at the upper end of the generally vertical member; a slidable frame adapted for snug fitment around the generally horizontal member, the slidable frame adapted to support an elongate object there-against and slidably positionable along the generally horizontal member; and a selectively tensionable strap releasably mountable to the generally horizontal member extending along the generally horizontal member and positionable over the slidable frame; whereby the selectively tensionable strap may be selectively tensioned to releasably frictionally hold an elongate object against the slidable frame and to simultaneously releasably frictionally secure the slidable frame against the generally horizontal member.

33 Claims, 12 Drawing Sheets

SPORT RACK

FIELD OF THE INVENTION

The present invention relates to a sport rack, in particular lo a cycle or ski rack attachable to a vehicle.

BACKGROUND OF THE INVENTION

Known sport, and in particular cycle and ski, racks are generally hung on a rear face of a vehicle by a suitable arrangement of hooks. Applicant is aware of a rudimentary receptacle for a cycle, which locates the cycle relative to the rear of the vehicle. Separate lashing or clamping devices are used to secure the cycle or skis to the rack firmly, by, for example, bungee cords.

Applicant is also aware of the following U.S. Pat. Nos.:
4,676,414, Deguevara, for Article Carrier;
5,303,857, Hewson, for Swing-Down Bicycle Carrier for Vehicles;
5,190,195, Fullhart et al, for Hitch Mounted Bicycle Rack;
5,181,822, Allsop et al, for Articulated Support Rack for Vehicles;
5,094,373, Lovci, for Sports Equipment Rack for Vehicle.

Deguevara teaches a vehicle mounted bicycle rack having a telescoping locking arm for securing a bicycle bar between the locking arm and a first tubular member connected to a vertical support column. Hewson, Fullhart et al, and Allsop et al all teach bicycle racks for attachment to vehicles, which bicycle racks have vertical support columns which may be pivoted about their base so as to lower the normally vertical support column so as to bring the normally horizontal bicycle support arms closer to the ground. Hewson provides a clamping arrangement for clamping bicycle bars between upper and lower horizontal clamping members. Fullhart et al discloses a clamp arm lockably pivotable about the vertical support column which when locked in a horizontal alignment clamps a bicycle bar into secure resting engagement with a pair of hook rods extending horizontally from the bicycle rack frame. Allsop et al teaches an arrangement by which bicycle support arms remain substantially horizontal as vertical support members of the rack are pivoted about their base.

Lovci teaches a vehicle mountable bicycle rack which may be pivoted horizontally about a hinged pair of cooperating horizontally extending arms so as to swing the rack and any bicycle mounted thereon in a horizontal arc away from the rearward end of the vehicle so as to allow access to a rear door on the vehicle.

The present invention provides an improved sport rack for which additional lashing or clamping means are not necessary, and onto which it is easier to load bicycles or skis. Thus it is an object of the present invention to provide a sport rack and in particular a bicycle and ski rack attachable to a vehicle, the rack having a vertical supporting column pivotable in a vertical arc about its base and a generally horizontal member extending from the upright support column having telescopically adjustable means therealong for tensioning a flexible or resilient band over bicycle bars or skis supported against the telescopically adjustable means. It is a further object to provide means for mounting the improved sport rack which may be adapted to secure the rack to a vehicle having European, North American Class I or II, or North American Class III style trailer hitches.

SUMMARY OF THE INVENTION

The present invention therefore provides, in its first aspect, a sport rack for affixing to a vehicle, having a generally horizontal carrier bar with at least one receiving means for a suitable part of a cycle or ski therealong, comprising a strap at one end attached to a ratcheted reel on the carrier bar, so that the strap can be drawn along the bar against the ratchet, past strap retaining hooks on each receiving means, to an attachment point for the strap, and means for allowing rotating of the reel with the ratchet thereby to enable the strap to be tightened against a cycle or ski part placed in the receiving means.

Preferably, there is more than one receiving means, enabling a plurality of cycles or skis to be carried on the rack.

The receiving means can be movable, as by sliding along the bar, to accommodate various widths of cycle or skis.

The receiving means can comprise a simple V-shaped trough. Preferably either side of the lips of the trough also have retaining hooks for the strap, which will ideally be disposed level with or lower than the lips of the trough to give a more positive retentive action. Thus, the cross-bar of the cycle can be placed in the V-shaped trough with the strip looping through a retaining hook, over the cross-bar, and through the opposed retaining hook.

Generally, it will be preferred if the strap can be detached from its attachment point, to permit cycles to be loaded and unloaded more easily. The attachment point can thus be a simple hook and eye arrangement.

The means for allowing rotation of the reel will preferably give a large mechanical advantage in that rotation, in order to give a high tension in the strap. A simple lever is sufficient.

Clearly, the rack should be designed so as to maintain loaded cycles well clear of the ground. Thus, in the known cycle rack, the cycle must be lifted through to a significant height in order to load it. In its second aspect, the present invention seeks to alleviate this factor, and to this end it provides a cycle rack for affixing to a vehicle having a generally upright post emanating from an attachment point on the vehicle, the post being fixable in the upright state but rotatable to a lower, non-upright state. Thus, it might be said that according to this aspect of the invention the cycle rack can be brought to the cycles, rather than the cycles being brought to the cycle rack.

Preferably, then, the upright post of the cycle rack is pivoted at an attachment point which also comprises a locking means for retaining the post in the upright state. The locking means can comprise a simple locking pin insertable into suitably aligned holes in the attachment point and upright post.

Thus what is provided is an external rack for attachment to a vehicle having a base releasably mountable on a vehicle with the base having a horizontally aligned sleeve adapted for snug sliding fitment over a trailer hitch tube extending rearwardly and substantially horizontally from the vehicle. The sleeve has an aperture in a lower surface thereof for alternative mounting of the sleeve to a trailer hitch tongue protruding substantially horizontally rearwardly from the vehicle by means of fastening means through the aperture and corresponding ball mounting aperture of the tongue. A generally vertical member has upper and lower ends and the generally vertical member is lockably and releasably mountable on an upper surface of the sleeve at the lower end. A generally horizontal member is releasably mountable to the generally vertical member at the upper end of the generally vertical member with means for releasably locking an elongate object against the generally horizontal member.

Advantageously, the external rack for attachment to a vehicle has means for releasably locking the elongate object against the generally horizontal member which has a slidable frame adapted for snug fitment around the generally horizontal member. The slidable frame is adapted to support the elongate object there-against and is slidably positionable along the generally horizontal member. The horizontal member has a selectively tensionable strap releasably mountable to the generally horizontal member extending along the generally horizontal member and positionable over the slidable frame. The selectively tensionable strap may be selectively tensioned to releasably frictionally hold an elongate object against the slidable frame and to simultaneously releasably frictionally secure the slidable frame against the generally horizontal member.

BRIEF DESCRIPTION OF THE DRAWINGS

An embodiment of the present invention will now be described, by way of example, with reference to the accompanying drawings, in which.

DETAILED DESCRIPTION OF THE PREFERRED EMBODIMENT

Figure 1:
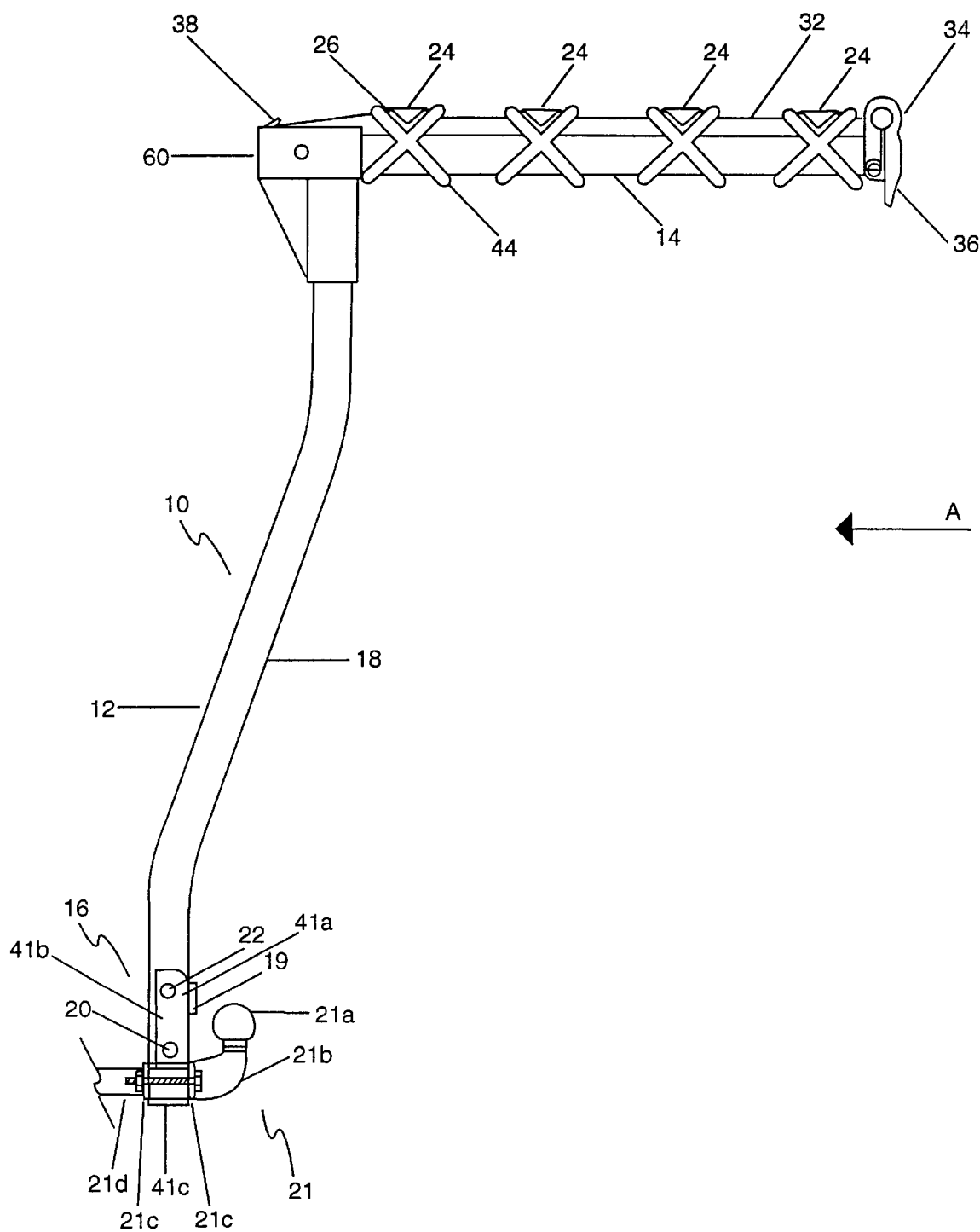
FIG. 1 is a view of a cycle rack according to the present invention from the side.

FIG. 1 shows a rack 10 according to the present invention. The rack 10 comprises three main sections; the supporting post 12, the horizontal carrier bar 14, and the base mounting section 16. The base mounting section 16 is adapted to be fixed to, for example, a tow bar of a vehicle, and from the base mounting section 16 extends generally upwardly the supporting post 12. At the top of the supporting post 12, the carrier bar 14 extends generally horizontally, away from the vehicle. Thus, bicycles suspended on the carrier bar 14 are held behind the vehicle.

The supporting post 12 is angled such that handle bars, pedals and the like do not rub against the vehicle when the cycle rack is installed and fully loaded with cycles. In the operational position (shown) the supporting post 12 is initially vertical at its junction with the base mounting section 16, but then comprises a curved portion curving away from the vehicle and leading to a straight portion 18 at an inclined angle. At the upper end of the supporting post 12, there is a further curved portion to bring the top end of the supporting post back to vertical. Supporting post 12 is selectively pivotally mounted to base mounting section 16. Thus supporting post 12 may be pivotally lowered over towhook 21 and the top end of supporting post 12 will thus be lowered into a position, for example, level with the lower portion of base mounting section 16.

The base mounting section 16 comprises a pair of pins 20 and 22 passing through aligned holes in the base section 16 and supporting post 12. Pin 20 is fixed and provides a pivot between the base mounting section 16 and supporting post 12 which allows the supporting post 12 to be rotated freely in a vertical arc about the base mounting section 16, fixed to the vehicle. This, as above described, allows the cycle rack to be rotated down, bringing the carrier bar 14 closer to the ground and allowing the cycles to be loaded more easily. The supporting post 12 can be fixed in the vertical operational position by inserting pin 22, which, though removable, acts as a locking pin.

When in the vertical position, post 12 butts against stop plate 23a (best seen in FIGS. 10–13) rigidly mounted between pin supports 23b, all of which forming part of the structure of base mounting section 16.

Figure 2:
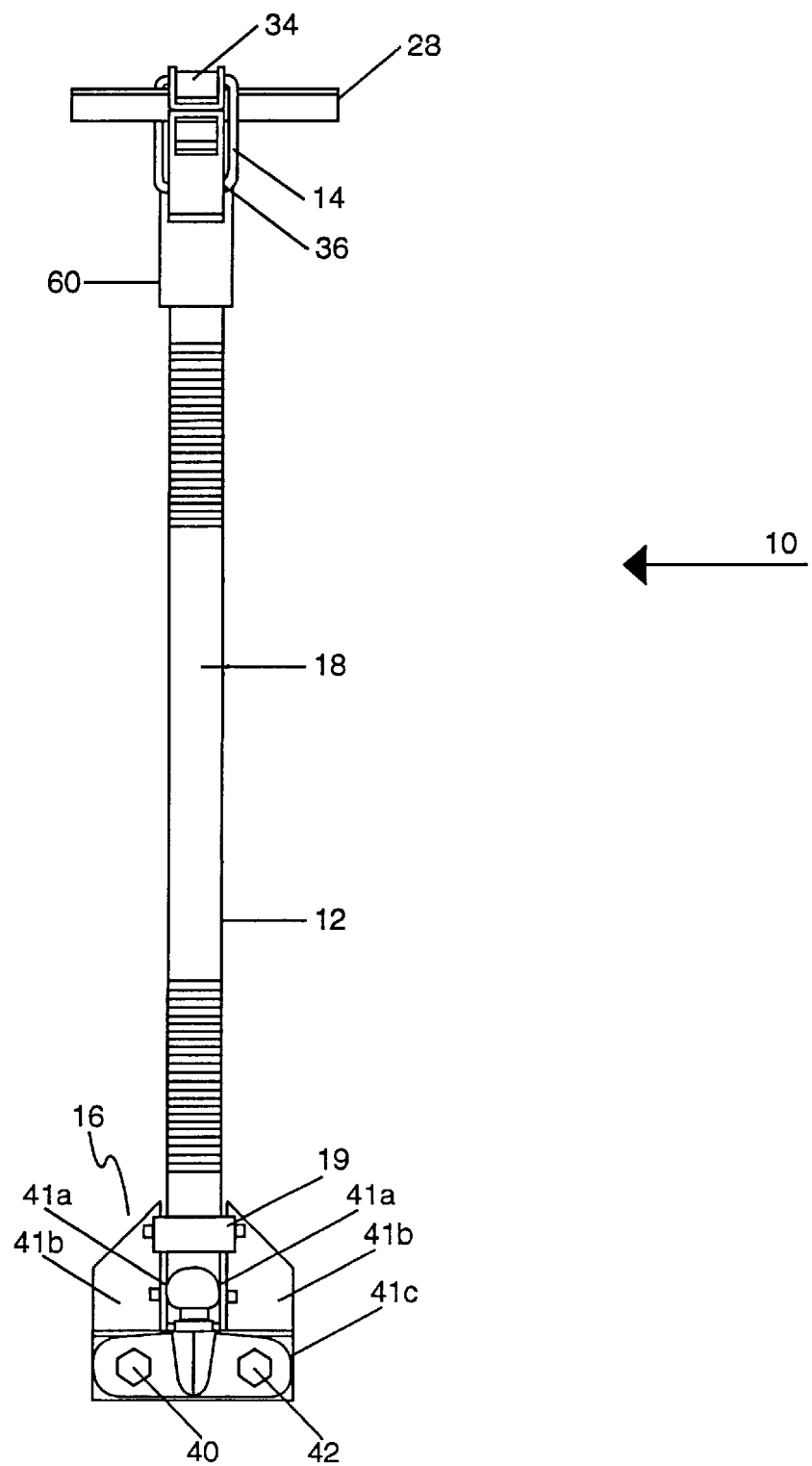
FIG. 2 is a view on arrow A of FIG. 1 with the trailer hitch removed.

In the embodiment shown in FIGS. 1 and 2, rack 10 has base mounting section 16 in a European adapted embodiment. Towhook 21, comprising ball 21a, and support member 21b is normally mounted directly to a vehicle towbar 21d by means of opposed flanges 21c. Base mounting section 16 may, as shown, be mounted between towbar 21d and support member 21b by mounting base mounting section 16 between flanges 21c, base mounting section 16 being secured by bolts through holes 40 and 42 (see FIG. 2) so as to extent, as illustrated, through flanges 21c on support member 21b, through base mounting section 16, and through flanges 21c on vehicle towbar 21d. A removable upper pin 22 allows rack 10 to pivot to, for example, a 45 degree angle. Removable lower pivot pin 20 provides a pivot for rotating rack 10, and allows for the detachment of the upper portion of rack 10 from base mounting section 16. Pin supports 41a and supporting flanges 41b are rigidly mounted to foot member 41c, which may be 1½ inches wide. A stop 19 may be attached to the supporting post 12 to abut against the towhook ball 21a in the lowered position and hold the rack 10 in that position.

As noted previously, the carrier bar 14 extends generally horizontally. Along the carrier bar 14 are a number of cycle bar receiving means 24, placed at intervals therealong. The cycle bar receiving means 24 are slidable along the carrier bar 14 to accommodate cycles of various width. Each cycle bar receiving means 24 provides a trough 26 in which a cycle bar 52 (see FIG. 6), e.g. a cross-bar of a cycle, can be located. The trough 26 is formed of a V-profile steel member 28 lined with rubber gripping pads 30. The detailed construction of each cycle bar receiving means 24 is described later with reference to FIG. 3.

A flexible strap 32 runs from a reel 34 attached at the end of the carrier bar 14. Strap 32 may be resilient. The reel 34 is rotatable by a mechanical lever 36, under the control of a ratchet (not shown). Thus, rotation of the lever 36 in a counter-clockwise direction as shown in FIG. 1 results in strap 32 being taken up by the reel 34 under control of the ratchet. The strap 32 can be withdrawn from the reel 34 by disengaging the ratchet and pulling strap 32.

In use, strap 32 is led along the top of the carrier bar 14, engaging each cycle bar receiving means 24 and securing cycle bar 52 therein. The free end of strap 32 may be connected to an attachable point 38, for example by a hook and eye arrangement.

Thus, to secure a cycle or cycles in the rack, strap 32 is disconnected at attachable point 38, if necessary, and lifted away from the carrier bar. The cycle or cycles are each placed in a cycle bar receiving means 24, and strap 32 is withdrawn from the reel (if necessary), threaded through each cycle bar receiving means 24 (i.e. under bars 50a and 50b, and over V-profile steel member 28), and attached at attachment point 38. Lever 36 is then operated to reel in strap 32. The mechanical advantage afforded by lever 36, in conjunction with the ratchet, allows strap 32 to be drawn taut. This firmly retains each cycle bar 52 in its corresponding cycle bar receiving means 24 by pressing the cycle bar 52 onto rubber gripping pads 30 as illustrated in FIG. 3.

In FIG. 2 it can be seen that on base mounting section 16 there is provision for two fixing points 40 and 42 for attaching rack 10 to a vehicle. Alternatively, as illustrated in FIGS. 7–14, base mounting section 16 may comprise trailer hitch tube mount 54, for use in co-operation with North American receiver-style hitches, securable within sleeve 56 by means of a pin or bolt journalled in hole 58 corresponding to aligned holes in tube mount 54.

Figure 3:
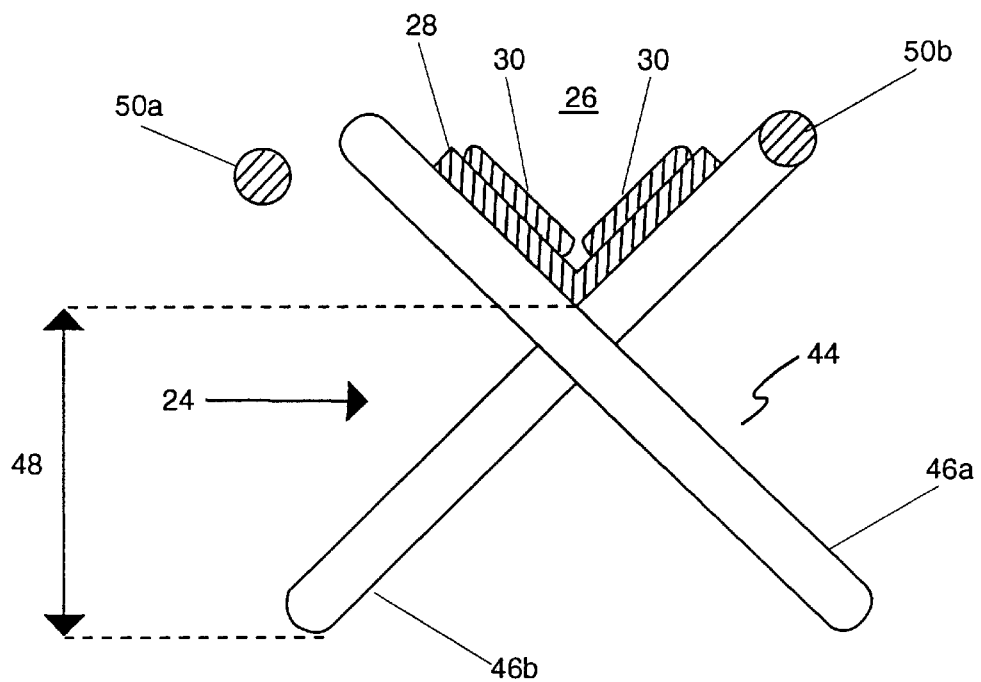
FIG. 3 is a view in cross-section of a cycle bar receiving means of FIG. 1.
Figure 5:
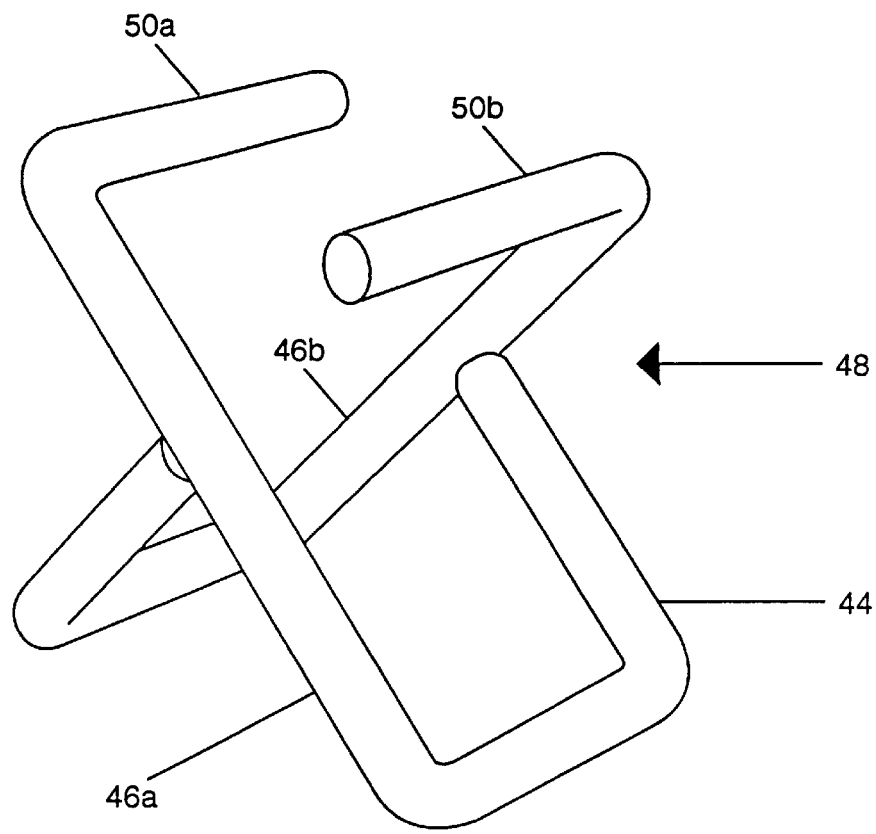
FIG. 5 shows an assembly of components as shown in FIG. 4 to produce part of the cycle bar receiving means of FIG. 1.

FIG. 3 shows one cycle bar receiving means 24 in cross-section. Each cycle bar receiving means 24 comprises V-shaped trough 26 for receiving cycle bar 52, and trough supporting structure 44 for supporting V-profile steel member 28. Trough supporting structure 44 is formed from two generally G-shaped members 46a and 46b fixed together at right angles, for example by welding, to form, in profile, an "X" shape. The open parts of the "G" are, in this embodiment, located each on the upper arms of the "X" but on transversely opposed sides of trough supporting structure 44, as shown in FIG. 5. Thus, after trough 26, that is, V-profile steel member 28, has been fixed in the upper part of the "X" to form cycle bar receiving means 24, there is defined a generally rectangular section aperture 48 through which carrier bar 14 can pass. Aperture 48 is bounded on its sides and bottom by oppositely-directed G-shaped members 46a and 46b and on its top by V-profile steel member 28.

Figure 4:
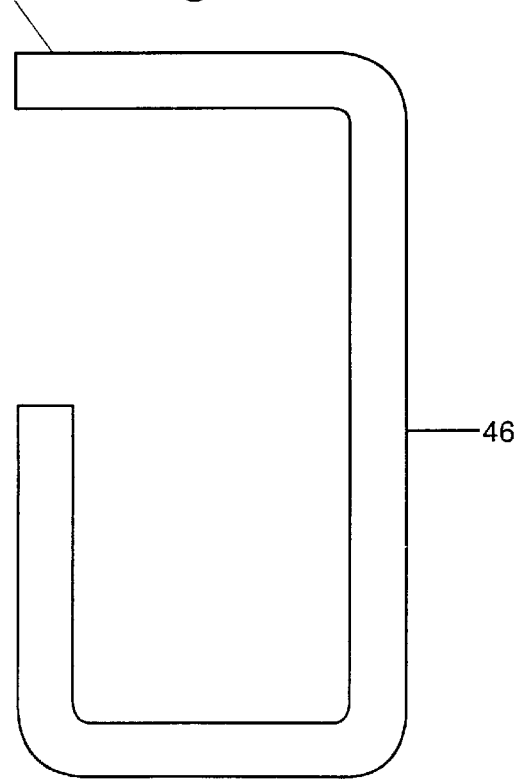
FIG. 4 is a view in cross-section of a component of the cycle bar receiving means depicted in FIG. 3.

FIG. 4 shows a plan view of a G-section, such as G-sections 46a and 46b, laid flat. FIG. 5 illustrates how G-sections 46a and 46b are assembled prior to attachment of V-profile steel member 28 and rubber gripping pads 30 to form trough 26.

Figure 6:
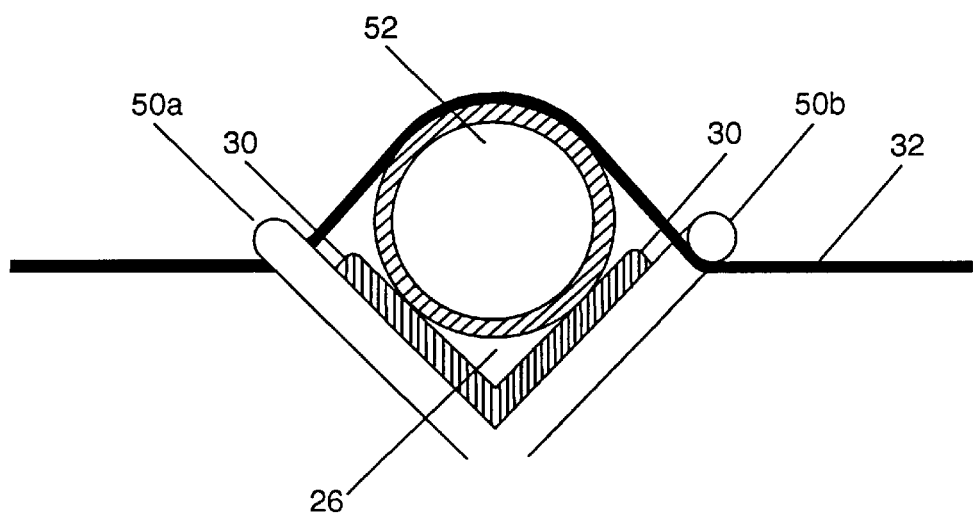
FIG. 6 shows, in cross-section, a cycle bar receiving means of a bicycle rack according to the present invention, in use.

FIG. 6 shows a cross-section of cycle bar receiving means 24 to show the arrangement of strap 32 in use. Strap 32 is passed below the retaining hook 50b formed by the upper part of the G-section 46b, above the lip of the V-profile steel member 28, and over the cycle bar 52 before passing over the opposing lip of the V-profile steel member 28 and under the retaining hook 50a formed by the upper part of the G-section 46a.

It may be that the reel 34 and associated ratchet and lever 36 may be located at the end of the carrier bar 14 closest to the vehicle, with corresponding movement of the attachment point 38. It is intended that all such modifications and those hereinafter set out are comprehended by the present invention.

Figure 7:
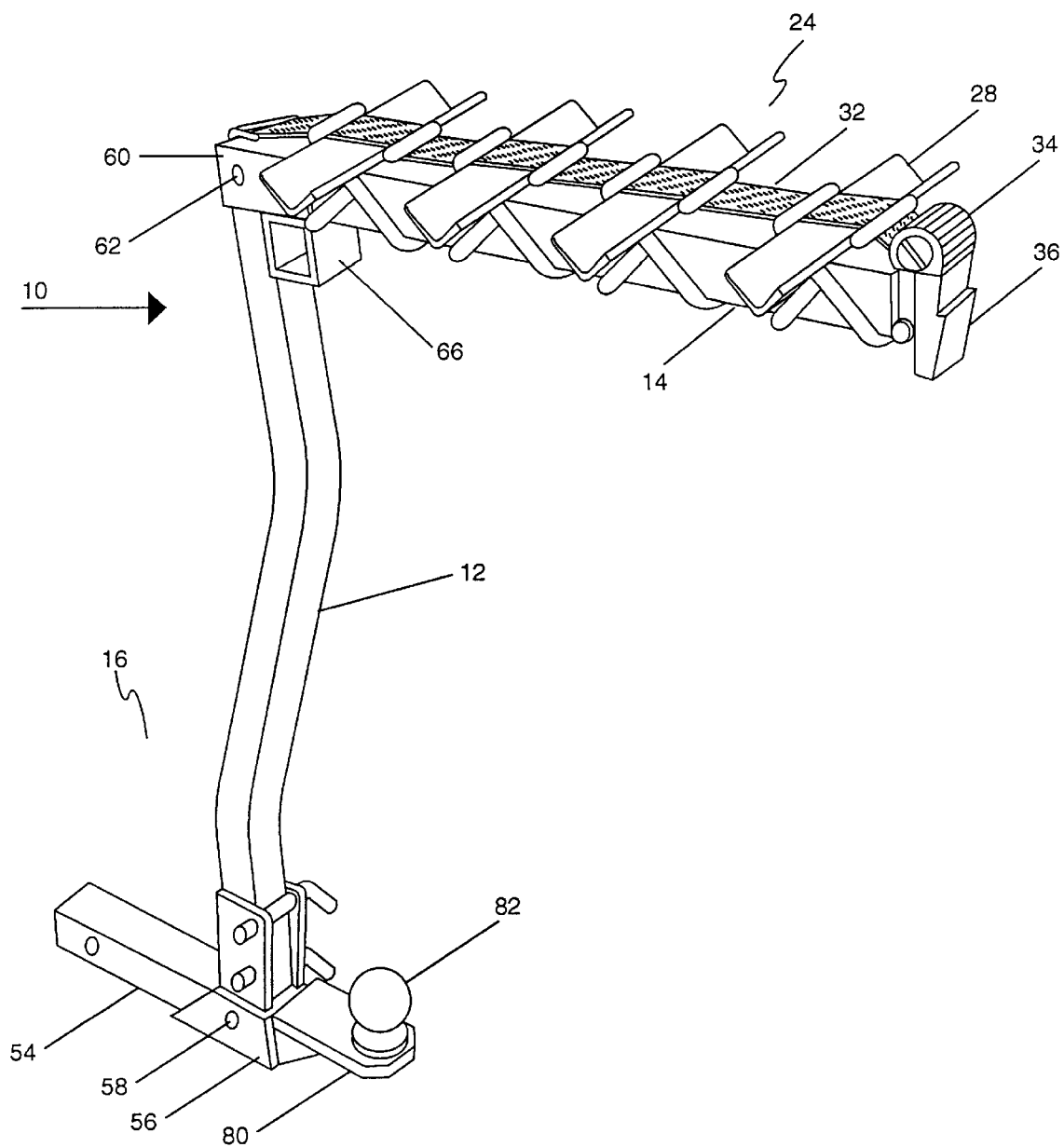
FIG. 7 is a perspective view of a cycle rack according to an alternative embodiment of the present invention.
Figure 8:
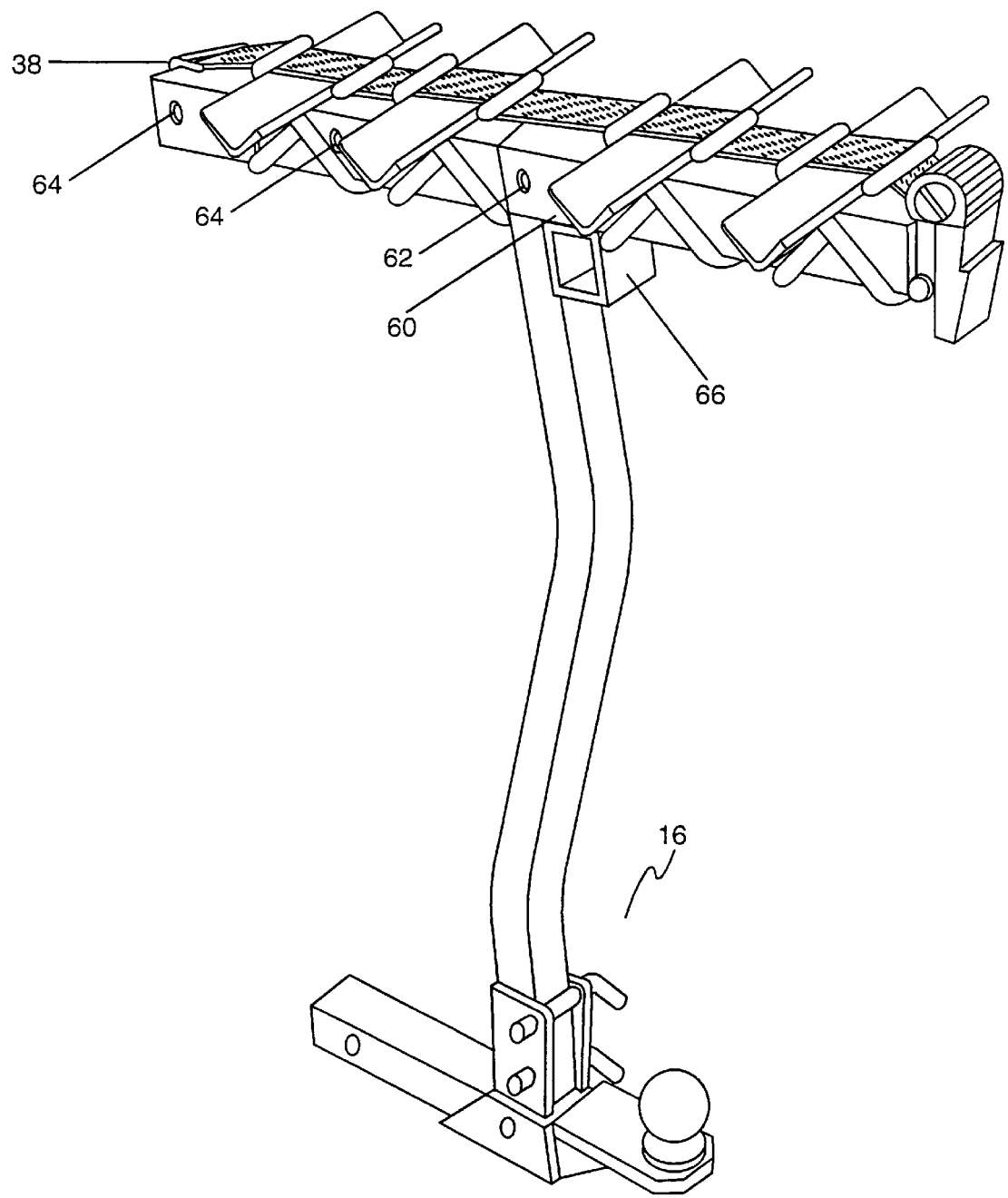
FIG. 8 is a perspective view of the bicycle rack of FIG. 7 with the carrier bar retracted into a non-telescoped position.

Thus, as illustrated in FIGS. 7 and 8, in an alternative embodiment, carrier bar fitting 60 is provided by which carrier bar 14 is mounted to the uppermost end of supporting post 12 so as to extend generally horizontally rearwards from supporting post 12 when rack 10 is in its vertical operational position. Carrier bar fitting 60 in the embodiment illustrated in FIGS. 1 and 2 has an upper horizontal sleeve for receiving therein an end of carrier bar 14, and rigidly mounted to the upper sleeve and extending downwardly from the upper sleeve is a lower vertical sleeve for receiving therein the uppermost end of supporting post 12. In the alternative embodiment illustrated in FIGS. 7 and 8, the upper horizontal sleeve portion of carrier bar fitting 60 is open ended to allow carrier bar 14 to be slid in snug telescoping fitment therethrough. Thus carrier bar 14 may be telescoped so as to extend rearwardly from supporting post 12 to an adjustable length. Holes 62 may be aligned with one of telescoping adjustment holes 64 in carrier bar 14 so that a pin (not shown) may be inserted to lock carrier bar 14 with the desired length of carrier bar 14 protruding rearwardly from supporting post 12.

In order to accomplish the telescoping adjustment of carrier bar 14 relative to supporting post 12, the locking pin is removed from hole 62 and corresponding hole 64. Then strap 32 is disconnected from attachment point 38, and carrier bar 14 is temporarily withdrawn from carrier bar fitting 60 so as to allow temporary removal of the requisite number of cycle bar receiving means 24 from carrier bar 14. Carrier bar 14 is then reinserted into carrier bar fitting 60 and slid to the desired position relative to supporting post 12. The pin is reinserted into hole 62 and corresponding carrier bar adjustment hole 64. The cycle bar receiving means 24 previously removed are remounted by sliding them onto the end of carrier bar 14 protruding on the vehicle side of supporting post 12 and strap 32 is rethreaded under arms 50a and 50b on cycle bar receiving means 24 and attached to attachment point 38 which in this embodiment is mounted to the end of carrier bar 14.

Figure 9:
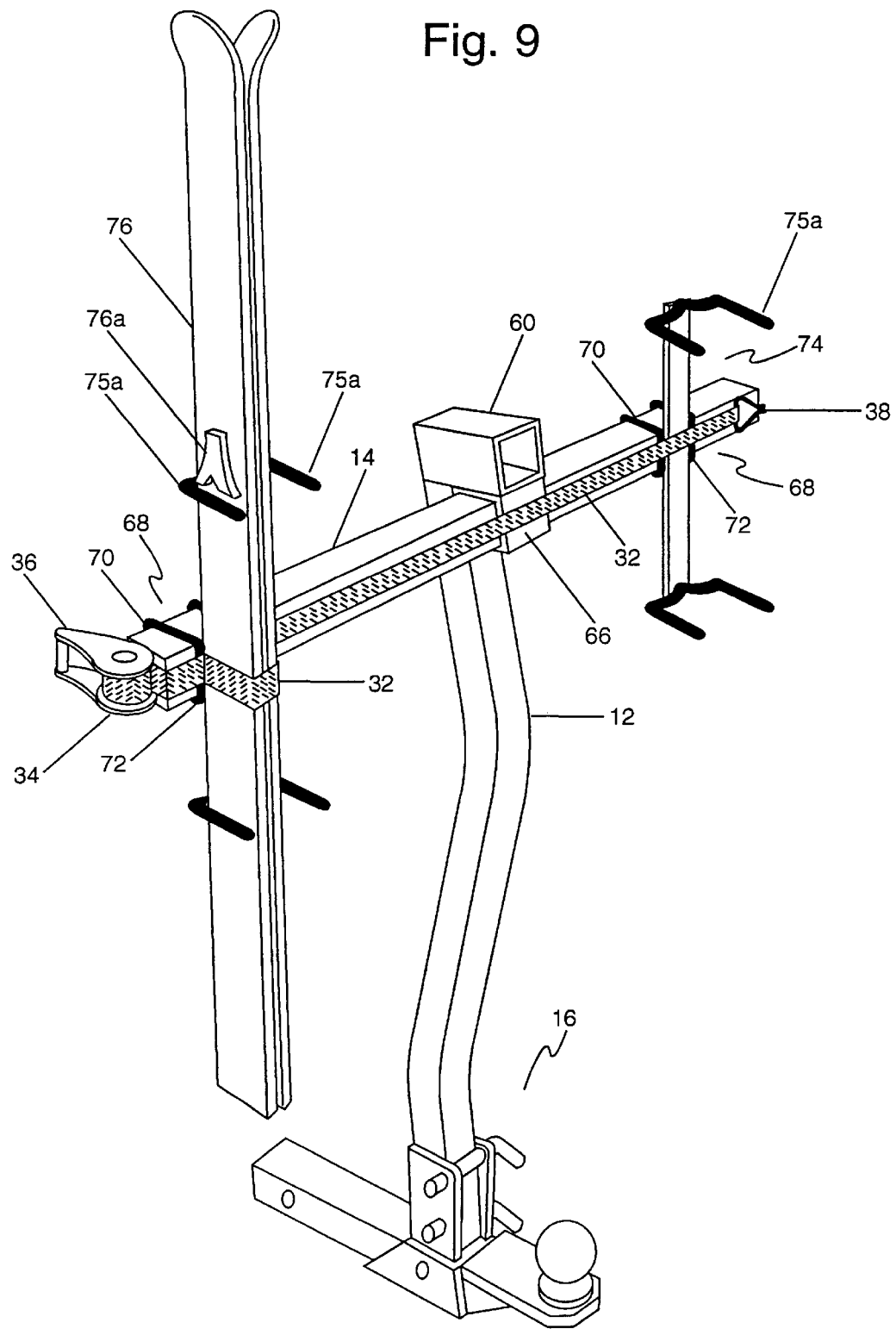
FIG. 9 is a perspective view of the rack of the present invention in an alternative embodiment adapted to carry skis.
Figure 10:
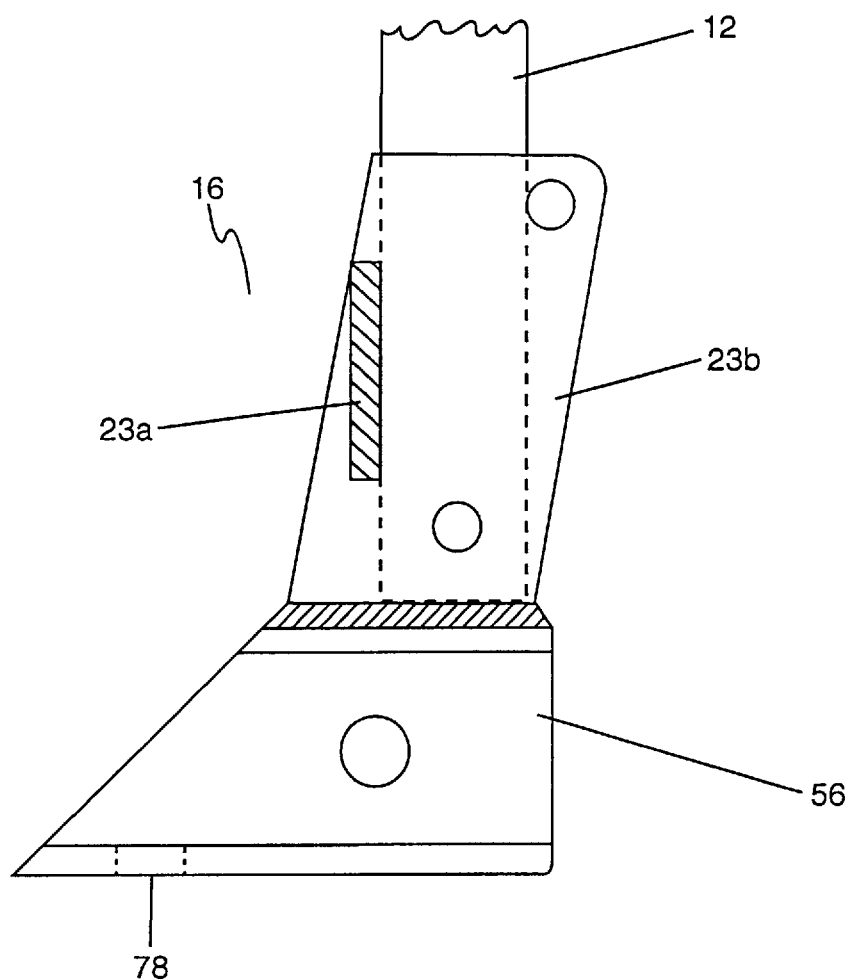
FIG. 10 is a partial side elevation view of base mounting section 16 mounted to supporting post 12.
Figure 11:
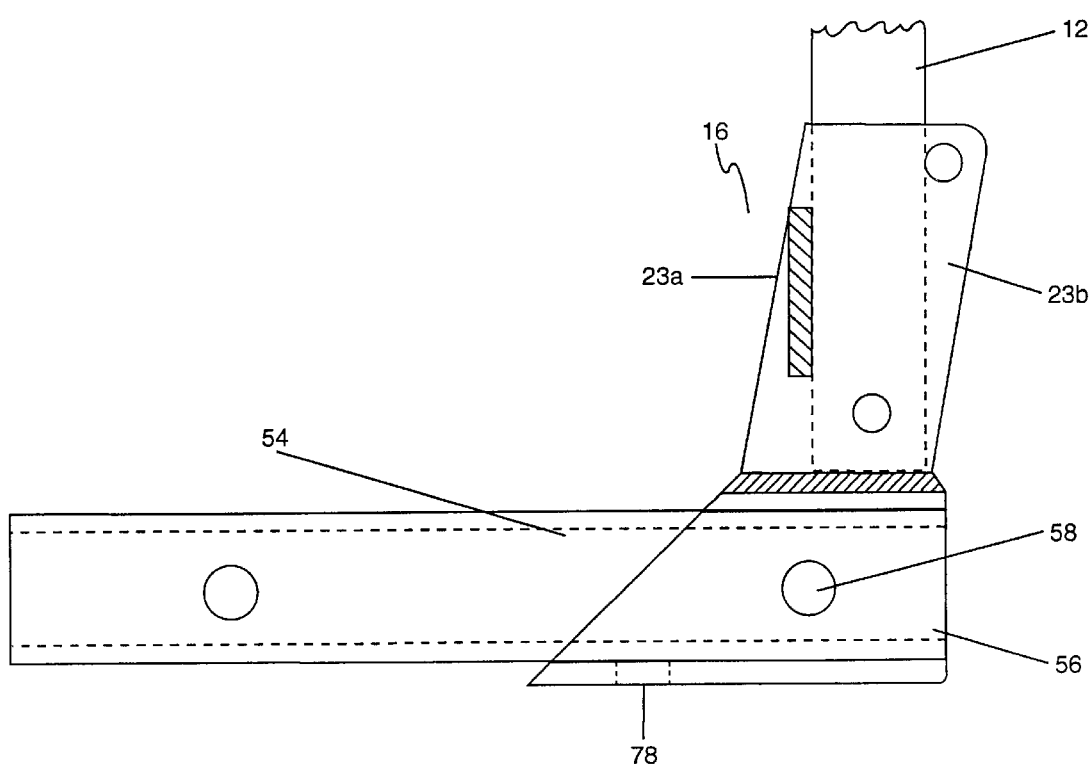
FIG. 11 is, in partial side elevation view, base mounting section 16 as depicted in FIG. 10 having tube 54 slidably mounted therein.
Figure 12:
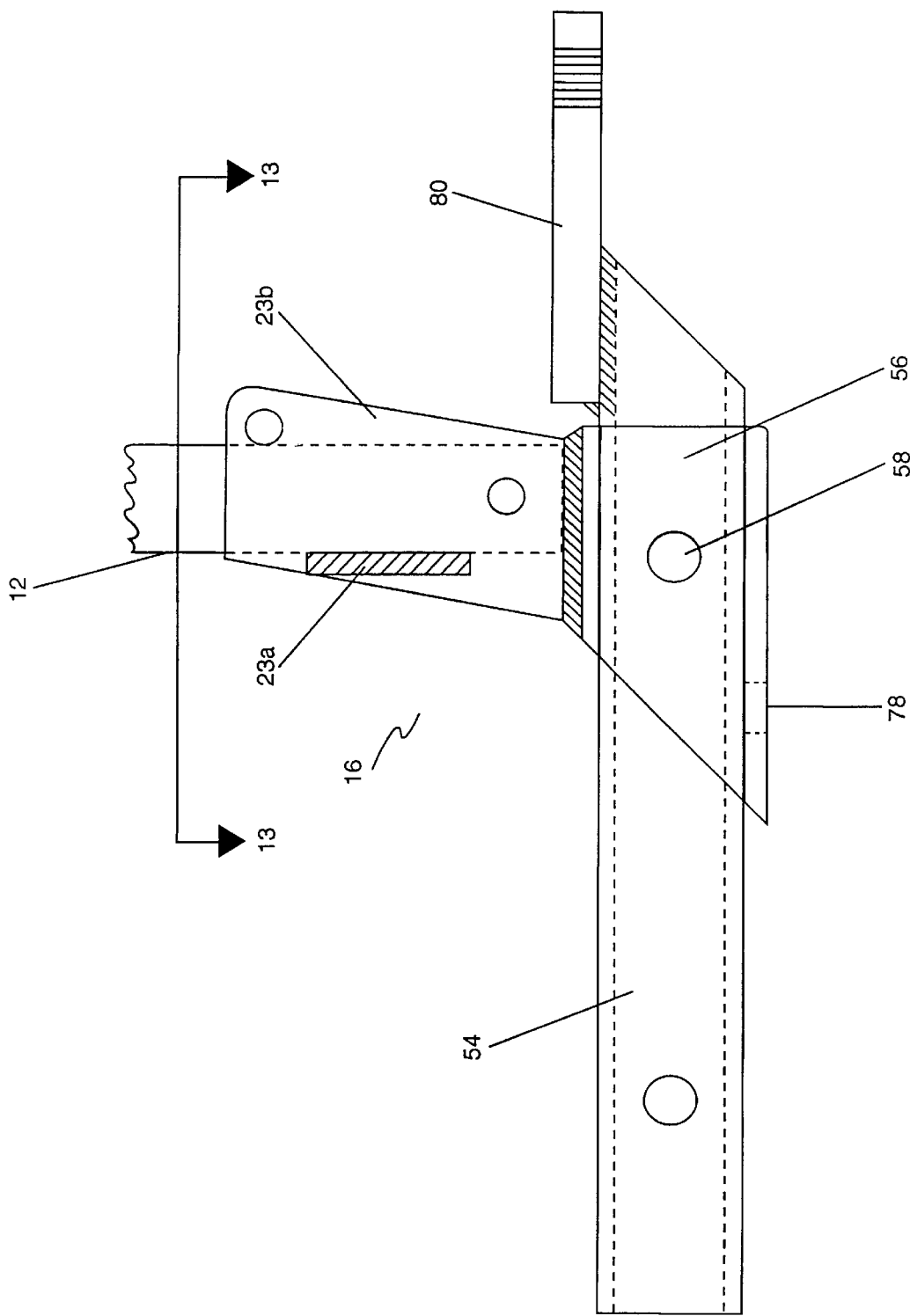
FIG. 12 is, in partial side elevation view, base mounting section 16 mounted on supporting post 12 with tube 54 slidably mounted therein, tube 54 having tongue 80 mounted thereto.
Figure 13:
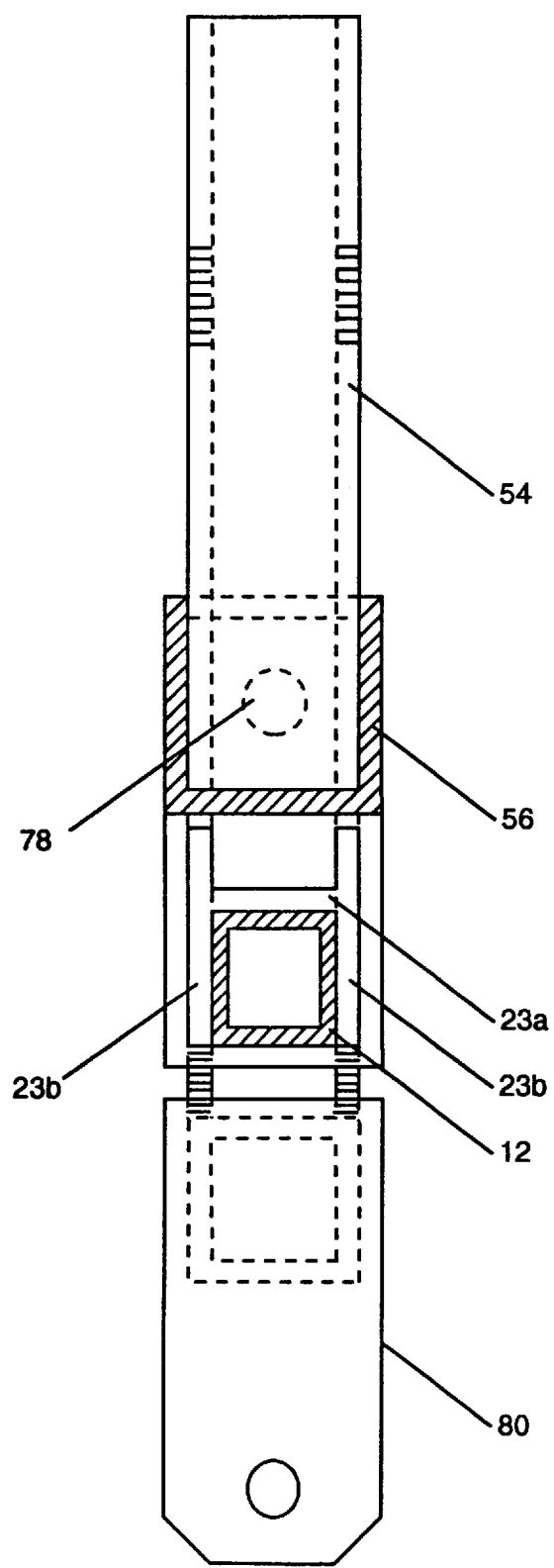
FIG. 13 is a cross-sectional view along line 13—13 in FIG. 12.
Figure 14:
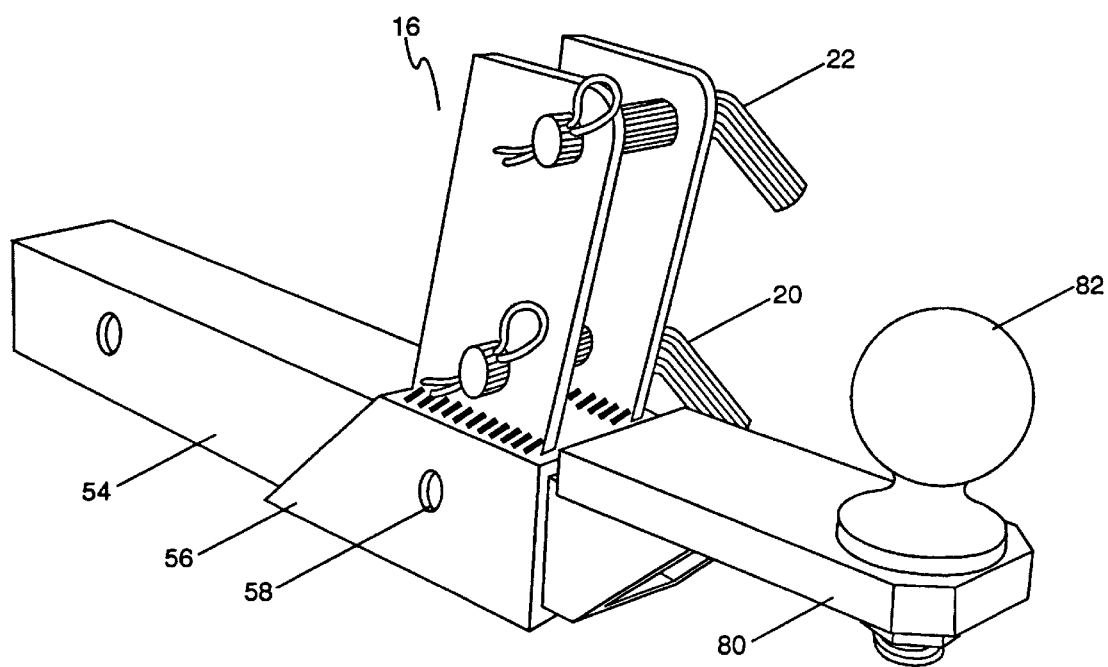
FIG. 14 is, in perspective view, base mounting section 16 as depicted in FIG. 12.

An auxiliary carrier bar fitting 66 is provided for converting rack 10 into a ski rack as illustrated in FIG. 9. Auxiliary carrier bar fitting 66 accepts, in snug sliding engagement therethrough, carrier bar. 14. Carrier bar 14 is installed in auxiliary carrier bar fitting 66 in a manner similar to that above described for adjusting the telescoped distance of carrier bar 14 relative to supporting post 12. However, in installing carrier bar 14 into auxiliary carrier bar fitting 66 so as to provide a ski rack, once carrier bar 14 is removed from carrier bar fitting 60, all of cycle bar receiving means 24 are removed from carrier bar 14. In their place are used ski receiving means 68. Carrier bar 14 is installed in auxiliary carrier bar fitting 66 rotated 90 degrees about its longitudinal axis from its orientation when installed in carrier bar fitting 60. Thus strap 32 is adjustably tensionable in a horizontal plane rather than in a vertical plane as is the case when carrier bar 14 is mounted in carrier bar fitting 60. Carrier bar 14 may be adjusted laterally in auxiliary carrier bar fitting 66 so as to either support equal numbers of pairs of skiis on either side of supporting post 12 or, if there is an obstruction to one side or the other of supporting post 12, then carrier bar 14 may be adjustably mounted in auxiliary carrier bar fitting 66 so as to avoid the obstruction. Alternatively, if there is an obstruction on both sides of supporting posts 12, then carrier bar 14 may be reinserted in the carrier bar fitting 60 extending generally horizontally away from the vehicle.

Ski receiving means 68 function in a similar manner to cycle bar receiving means 24 in their principal of securement to carrier bar 14 and in the manner in which strap 32 is threaded underneath pairs of opposed arms traversing the path of strap 32. As is apparent from FIG. 9, ski receiving means 68 have carrier bar caging members 70 which provide an encircling frame which may be slid onto carrier bar 14. Rigidly mounted to carrier bar caging members 70 are transverse strap retaining arms 72. Also mounted to carrier bar caging members 70 is ski supporting bracket 74. Ski supporting bracket 74 may, as illustrated, be merely an opposed pair of generally horizontal forks mounted on a vertical frame, the vertical frame attached to carrier bar caging members 70. Skis 76 may be placed within the opposed pair of generally horizontal forks forming ski supporting bracket 74 and strap 32 utilized to retain skis 76 firmly therein when strap 32 is tightened by the action of lever 36 gathering strap 32 onto reel 34 as above described with respect to the bicycle carrying embodiment of the present invention. Ski bindings 76a may be allowed to rest on upper horizontal forks 75a.

In a further alternative preferred embodiment preferably for North American style vehicular trailer hitches, as illustrated in FIGS. 10–14, it may be seen that base mounting section 16 includes sleeve 56 which may be either: (a) slidably adjustable on a class III receiver type hitch tube mount 54, or (b) by means of mounting bolt holes 78 on sleeve 56, which is designed for vehicles not equipped with receiver style hitches, that is, is designed for tongue or flat-type draw bar hitches (eg class I or class II hitches) or for hitches fashioned from the flat step of a truck bumper, sleeve 56 being mounted either by means of the vehicle trailer ball or a bolt through bolt hole 78 or, (c) for smaller diameter tube mounts 54, sleeve 56 may be directly mounted on tongue 80 in place of ball 82 or sandwiched between ball 82 and tongue 80.

Thus base mounting section 16 of the present invention addresses the difficulty of universality of mounting external accessories such as the present sport rack to the rear of vehicles. Further, tube mount 54 may be extended and, with sleeve 56 selectively positioned therealong, allow for the carrying of a plurality of bicycles while at the same time towing a trailer by means of ball 82 on tongue 80 mounted, as illustrated, to the rearmost end of tube mount 54. Sleeve 56 may be selectively positioned on tube mount 54 so that, with carrier bar 14 adjusted relative to supporting post 12, bicycles are carried either forward of supporting post 12, rear of supporting post 12, or a combination of bicycles both forward and rear of supporting post 12. Carrying bicycles in-board, that is, forward of supporting post 12 allows a turning radius for the vehicle while towing a trailer in certain vehicle and trailer applications which would otherwise not be possible.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An external rack for attachment to a vehicle comprising:

a base releasably mountable on a vehicle, said base comprising a horizontally aligned sleeve, other than a trailer hitch receiving tube, adapted for snug sliding fitment over a trailer hitch tube so as to journal said trailer hitch tube in said sleeve, a generally vertical member having upper and lower ends, said generally vertical member lockably, releasably mountable on said sleeve at said lower end of said generally vertical member, a generally horizontal member releasably mountable to said generally vertical member at said upper end of said generally vertical member, a slidable frame adapted for snug fitment around said generally horizontal member, said slidable frame adapted to support an elongate object there-against and slidably positionable along said generally horizontal member, a selectively tensionable strap releasably mountable to said generally horizontal member extending along said generally horizontal member and positionable over said slidable frame, whereby said selectively tensionable strap may be selectively tensioned to releasably frictionally hold an elongate object against said slidable frame and to simultaneously releasably frictionally secure said slidable frame against said generally horizontal member, further comprising means for slidably lockably positioning said generally horizontal member on said upper end of said generally vertical member in releasably mountable engagement with said upper end, whereby said generally horizontal member is slidably lockably positionable on said upper end of said generally vertical member;

wherein said means for slidably lockably positioning said generally horizontal member on said upper end further comprises means for releasably mounting said generally horizontal member in a first orientation longitudinally rearward of said vehicle and for releasably mounting said generally horizontal member in a second orientation transversely behind said vehicle, wherein said means for slidably lockably positioning said generally horizontal member on said upper end of said generally vertical member comprises a sleeve mounted to said upper end of said generally vertical member through which may be snugly journalled said generally horizontal member, wherein said means for releasably mounting said generally horizontal member in a first orientation longitudinally rearward of said vehicle and for releasably mounting said generally horizontal member in a second orientation transversely behind said vehicle comprises first and second orthogonally aligned sleeves mounted to said upper end of said generally vertical member, each of said first and second sleeves sized to snugly receive said generally horizontal member when journalled therethrough.

2. An external rack for attachment to a vehicle comprising:

a base releasably mountable on a vehicle, said base comprising a horizontally aligned sleeve, other than a trailer hitch receiving tube, adapted for snug sliding fitment over a trailer hitch tube so as to journal said trailer hitch tube in said sleeve, a generally vertical member having upper and lower ends, said generally vertical member lockably, releasably mountable on said sleeve at said lower end of said generally vertical member, a generally horizontal member releasably mountable to said generally vertical member at said upper end of said generally vertical member, a slidable frame adapted for snug fitment around said generally horizontal member, said slidable frame adapted to support an elongate object there-against and slidably positionable along said generally horizontal member, a selectively tensionable, strap releasably mountable to said generally horizontal member extending along said generally horizontal member and positionable over said slidable frame, whereby said selectively tensionable strap may be selectively tensioned to releasably frictionally hold an elongate object against said slidable frame and to simultaneously releasably frictionally secure said slidable frame against said generally horizontal member, wherein said slidable frame comprises first and second "G"-shaped brackets, each of said G-shaped brackets having an upper horizontally extending arm, a longer member connecting one end of said upper horizontal arm to one end of a base member, a shorter member extending generally perpendicularly from an end of said base member opposed to said end of said base member connected to said longer member, said shorter member parallel to said longer member, said first and second G-shaped members mounted to each other so as to generally form an "X" when viewed from a first transverse direction, on said first G-shaped member an end of said shorter member opposed said base member mounted to said longer member on said second G-shaped member substantially mid-way along said longer member on said second G-shaped member, said first G-shaped member thus mounted to said second G-shaped member forming said "X" shape when viewed from said first transverse direction, said first G-shaped member when thus mounted to said second G-shaped member thereby forming a generally rectangular aperture therethrough, on said first and second G-shaped members, said upper horizontally extending arms, said longer members, said base members and said shorter members, when viewed from a second longitudinal direction orthogonal to said first transverse direction, said aperture sized to receive therethrough said generally horizontal member, said upper horizontally extending arm on said first G-shaped member and said upper horizontally extending arm on said second G-shaped member forming a transversely opposed pair of hooks when said first G-shaped member is mounted to said second G-shaped member, said slidable frame further comprising an elongate object supporting member mounted between said upper horizontally extending arm on said first G-shaped bracket and said upper horizontally extending arm on said second G-shaped bracket when said first and second G-shaped brackets are mounted to each other, whereby said selectively tensionable strap may be looped under said upper horizontally extending arm on said first G-shaped bracket and under said upper horizontally extending arm on said second G-shaped bracket so as to hold an elongate object supported against said elongate object support member and under said selectively tensionable strap.

3. The device of claim 2 wherein said upper horizontally extending arms on said first and second G-shaped brackets define generally, when said first and second G-shaped brackets are mounted together, a first plane and said elongate object support member supports an elongate object between said upper horizontally extending arms so as to intersect said first plane with said elongate object thereby requiring said selectively tensionable strap when hooked under said upper horizontally extending arms and over an elongate object supported in said elongate object support member, when said selectively tensionable strap is selectively tensioned, compresses an elongate object supported against said elongate object support member against said elongate object support member.

4. The device of claim 3 wherein said elongate object support member comprises sides extending from said elongate object support member beneath said first plane so as to extend to a position above said first plane on either side of an elongate object supported against said elongate object support member.

5. The device of claim 4 wherein said selectively tensionable strap is selectively tensionable by means of a ratchet mechanism mounted to said generally horizontal member.

6. The device of claim 4 wherein said selectively tensionable strap comprises a resilient strap mounted to said generally horizontal member.

7. An external rack for attachment to a vehicle, said vehicle having either a trailer hitch tube or a trailer hitch tongue, said trailer hitch tongue having a trailer ball mountable to a ball mounting aperture in said trailer hitch tongue, said external rack comprising:

a base releasably mountable on a vehicle, said base comprising a horizontally aligned sleeve, other than a trailer hitch receiving tube, adapted for snug sliding fitment over said trailer hitch tube so as to journal said trailer hitch tube within said sleeve, said sleeve having an aperture in a lower-most generally horizontal surface thereof for mounting of said sleeve on to an upper surface of a trailer hitch tongue, said sleeve mountable to said trailer hitch tongue by means of fastening means mountable through said aperture in said lower-most surface of said sleeve and through said ball mounting aperture in said trailer hitch tongue, a generally vertical member having upper and lower ends, said generally vertical member lockably, releasably mountable on an upper surface of said sleeve at said lower end, a generally horizontal member releasably mountable to said generally vertical member at said upper end of said generally vertical member, means for releasably locking an elongate object against said generally horizontal member.

8. A device of claim 7 wherein said means for releasably locking said elongate object against said generally horizontal member comprises a slidable frame adapted for snug fitment around said generally horizontal member, said slidable frame adapted to forthsaid elongate object there-against and slidably positionable along said generally horizontal member, a selectively tensionable strap releasably mountable to said generally horizontal member extending along said generally horizontal member and positionable over said slidable frame, whereby said selectively tensionable strap may be selectively tensioned to releasably frictionally hold an elongate object against said slidable frame and to simultaneously releasably frictionally secure said slidable frame against said generally horizontal member.

9. The device of claim 8 further comprising means for slidably lockably positioning said generally horizontal member on said upper end of said generally vertical member in releasably mountable engagement with said upper end, whereby said generally horizontal member is slidably lockably positionable on said upper end of said generally vertical member.

10. The device of claim 9 wherein said means for slidably lockably positioning said generally horizontal member on said upper end further comprises means for releasably mounting said generally horizontal member in a first orientation longitudinally rearward of said vehicle and for releasably mounting said generally horizontal member in a second orientation transversely behind said vehicle.

11. The device of claim 10 wherein said means for slidably lockably positioning said generally horizontal member on said upper end of said generally vertical member comprises a sleeve mounted to said upper end of said generally vertical member through which may be snugly journalled said generally horizontal member.

12. The device of claim 11 wherein said means for releasably mounting said generally horizontal member in a first orientation longitudinally rearward of said vehicle and for releasably mounting said generally horizontal member in a second orientation transversely behind said vehicle comprises first and second orthogonally aligned sleeves mounted to said upper end of said generally vertical member, each of said first and second sleeves sized to snugly receive said generally horizontal member when journalled therethrough.

13. The device of claim 8 wherein said selectively tensionable strap is selectively tensionable by means of a ratchet mechanism mounted to said generally horizontal member.

14. The device of claim 8 wherein said selectively tensionable strap comprises a resilient strap mounted to said generally horizontal member.

15. An external rack for attachment to a vehicle comprising:
   a base releasably mountable on a vehicle,
   a generally vertical member having upper and lower ends, said generally vertical member lockably, releasably mountable on said base at said lower end,
   a generally horizontal member releasably mountable to said generally vertical member at said upper end of said generally vertical member,
   a slidable frame adapted for snug fitment around said generally horizontal member, said slidable frame adapted to support an elongate object there-against and slidably positionable along said generally horizontal member,
   a selectively tensionable strap releasably mountable to said generally horizontal member extending along said generally horizontal member and positionable over said slidable frame,
   whereby said selectively tensionable strap may be selectively tensioned to releasably frictionally hold an elongate object against said slidable frame and to simultaneously releasably frictionally secure said slidable frame against said generally horizontal member,
   means for slidably lockably positioning said generally horizontal member on said upper end of said generally vertical member in releasably mountable engagement with said upper end, whereby said generally horizontal member is slidably lockably positionable on said upper end of said generally vertical member,
   wherein said means for slidably lockably positioning said generally horizontal member on said upper end further comprises means for releasably mounting said generally horizontal member in a first orientation longitudinally rearward of said vehicle and for releasably mounting said generally horizontal member in a second orientation transversely behind said vehicle,
   wherein said means for slidably lockably positioning said generally horizontal member on said upper end of said generally vertical member comprises a sleeve mounted to said upper end of said generally vertical member through which may be snugly journalled said generally horizontal member, and
   wherein said means for releasably mounting said generally horizontal member in a first orientation longitudinally rearward of said vehicle and for releasably mounting said generally horizontal member in a second orientation transversely behind said vehicle comprises first and second orthogonally aligned sleeves mounted to said upper end of said generally vertical member, each of said first and second sleeves sized to snugly receive said generally horizontal member when journalled therethrough.

16. An external rack for attachment to a vehicle comprising:
   a base releasably mountable on a vehicle,
   a generally vertical member having upper and lower ends, said generally vertical member lockably, releasably mountable on said base at said lower end,
   a generally horizontal member releasably mountable to said generally vertical member at said upper end of said generally vertical member,
   a slidable frame adapted for snug fitment around said generally horizontal member, said slidable frame adapted to support an elongate object there-against and slidably positionable along said generally horizontal member,
   a selectively tensionable strap releasably mountable to said generally horizontal member extending along said generally horizontal member and positionable over said slidable frame,
   whereby said selectively tensionable strap may be selectively tensioned to releasably frictionally hold an elongate object against said slidable frame and to simultaneously releasably frictionally secure said slidable frame against said generally horizontal member,
   means for slidably lockably positioning said generally horizontal member on said upper end of said generally vertical member in releasably mountable engagement with said upper end, whereby said generally horizontal member is slidably lockably positionable on said upper end of said generally vertical member,
   wherein said means for slidably lockably positioning said generally horizontal member on said upper end further comprises means for releasably mounting said generally horizontal member in a first orientation longitudinally rearward of said vehicle and for releasably mounting said generally horizontal member in a second orientation transversely behind said vehicle,
   wherein said means for slidably lockably positioning said generally horizontal member on said upper end of said generally vertical member comprises a sleeve mounted to said upper end of said generally vertical member through which may be snugly journalled said generally horizontal member, and
   wherein said means for releasably mounting said generally horizontal member in a first orientation longitudinally rearward of said vehicle and for releasably mounting said generally horizontal member in a second orientation transversely behind said vehicle comprises first and second orthogonally aligned sleeves mounted to said upper end of said generally vertical member, each of said first and second sleeves sized to snugly receive said generally horizontal member when journalled therethrough, and wherein said slidable frame comprises first and second "G"-shaped brackets, each of said G-shaped brackets having an horizontally extending arm, a longer member connecting one end of said upper horizontal arm to one end of a base member, a shorter member extending generally perpendicularly from an end of said base member opposed to said end of said base member connected to said longer member, said shorter member parallel to said longer member, said first and second G-shaped members mounted to each other so as to generally form an "X" when viewed from a first transverse direction, on said first G-shaped member an end of said shorter member opposed said base member mounted to said longer member on said second G-shaped member substantially mid-way along said longer member on said second G-shaped member, said first G-shaped member thus mounted to said second G-shaped member forming said "X" shape when viewed from said first transverse direction, said first G-shaped member when thus mounted to said second G-shaped member thereby forming a generally rectangular aperture therethrough, on said first and second G-shaped members, said upper horizontally extending arms, said longer members, said base members and said shorter members, when viewed from a second longitudinal direction orthogonal to said first transverse direction, said aperture sized to receive therethrough said generally horizontal member, said upper horizontally extending arm on said first G-shaped member and said upper horizontally extending arm on said second G-shaped member forming a transversely opposed pair of hooks when said first G-shaped member is mounted to said second G-shaped member, said slidable frame further comprising an elongate object supporting member mounted between said upper horizontally extending arm on said first G-shaped bracket and said upper horizontally extending arm on said second G-shaped bracket when said first and second G-shaped brackets are mounted to each other, whereby said selectively tensionable strap may be looped under said upper horizontally extending arm on said first G-shaped bracket and under said upper horizontally extending arm on said second G-shaped bracket so as to hold an elongate object supported against said elongate object support member and under said selectively tensionable strap.

17. The device of claim 16 wherein said upper horizontally extending arms on said first and second G-shaped brackets define generally, when said first and second G-shaped brackets are mounted together, a first plane and said elongate object support member supports an elongate object between said upper horizontally extending arms so as to intersect said first plane with said elongate object thereby requiring said selectively tensionable strap when hooked under said upper horizontally extending arms and over an elongate object supported in said elongate object support member, when said selectively tensionable strap is selectively tensioned, compresses an elongate object supported against said elongate object support member against said elongate object support member.

18. The device of claim 17 wherein said elongate object support member comprises sides extending from said elongate object support member beneath said first plane so as to extend to a position above said first plane on either side of an elongate object supported against said elongate object support member.

19. The device of claim 18 wherein said selectively tensionable strap is selectively tensionable by means of a ratchet mechanism mounted to said generally horizontal member.

20. The device of claim 18 wherein said selectively tensionable strap comprises a resilient strap mounted to said generally horizontal member.

21. An external rack for attachment to a vehicle comprising:

a base releasably mountable on a vehicle, a generally vertical member having upper and lower ends, said generally vertical member lockably, releasably mountable on said base at said lower end, a generally horizontal member releasably mountable to said generally vertical member at said upper end of said generally vertical member, a slidable frame adapted for snug fitment around said generally horizontal member, said slidable frame adapted to support an elongate object there-against and slidably positionable along said generally horizontal member, a selectively tensionable strap releasably mountable to said generally horizontal member extending along said generally horizontal member and positionable over said slidable frame, whereby said selectively tensionable strap may be selectively tensioned to releasably frictionally hold an elongate object against said slidable frame and to simultaneously releasably frictionally secure said slidable frame against said generally horizontal member, wherein said slidable frame comprises first and second "G" shaped brackets, each of said G-shaped brackets having an upper horizontally extending arm, a longer member connecting one end of said upper horizontal arm to one end of a base member, a shorter member extending generally perpendicularly from an end of said base member opposed to said end of said base member connected to said longer member, said shorter member parallel to said longer member, said first and second G-shaped members mounted to each other so as to generally form an "X" when viewed from a first transverse direction, on said first G-shaped member an end of said shorter member opposed said base member mounted to said longer member on said second G-shaped member substantially mid-way along said longer member on said second G-shaped member, said first G-shaped member thus mounted to said second G-shaped member forming said "X" shape when viewed from said first transverse direction, said first G-shaped member when thus mounted to said second G-shaped member thereby forming a generally rectangular aperture therethrough, on said first and second G-shaped members, said upper horizontally extending arms, said longer members, said base members and said shorter members, when viewed from a second longitudinal direction orthogonal to said first transverse direction, said aperture sized to receive therethrough said generally horizontal member, said upper horizontally extending arm on said first G-shaped member and said upper horizontally extending arm on said second G-shaped member forming a transversely opposed pair of hooks when said first G-shaped member is mounted to said second G-shaped member, said slidable frame further comprising an elongate object supporting member mounted between said upper horizontally extending arm on said first G-shaped bracket and said upper horizontally extending arm on said second G-shaped bracket when said first and second G-shaped brackets are mounted to each other, whereby said selectively tensionable strap may be looped under said upper horizontally extending arm on said first G-shaped bracket and under said upper horizontally extending arm on said second G-shaped bracket so as to hold an elongate object supported against said elongate object support member and under said selectively tensionable strap.

22. The device of claim 21 wherein said upper horizontally extending arms on said first and second G-shaped brackets define generally, when said first and second G-shaped brackets are mounted together, a first plane and said elongate object support member supports an elongate object between said upper horizontally extending arms so as to intersect said first plane with said elongate object thereby requiring said selectively tensionable strap when hooked under said upper horizontally extending arms and over an elongate object supported in said elongate object support member, when said selectively tensionable strap is selectively tensioned, compresses an elongate object supported against said elongate object support member against said elongate object support member.

23. The device of claim 22 wherein said elongate object support member comprises sides extending from said elongate object support member beneath said first plane so as to extend to a position above said first plane on either side of an elongate object supported against said elongate object support member.

24. The device of claim 23 wherein said selectively tensionable strap is selectively tensionable by means of a ratchet mechanism mounted to said generally horizontal member.

25. The device of claim 23 wherein said selectively tensionable strap comprises a resilient strap mounted to said generally horizontal member.

26. An external rack for attachment to a vehicle, said vehicle having either a trailer hitch tube or a trailer hitch tongue, said trailer hitch tongue having a trailer ball mounted to a ball mounting aperture in said trailer hitch tongue, said external rack comprising:

a base releasably mountable on a vehicle, said base comprising a horizontally aligned sleeve adapted for snug sliding fitment over said trailer hitch tube, said sleeve having an aperture in a lower generally horizontal surface thereof for mounting of said sleeve to an upper horizontal surface of said trailer hitch tongue by means of fastening means, said sleeve mountable to said trailer hitch tongue mountable through said aperture in said lower surface of said sleeve through said ball mounting aperture in said trailer hitch tongue, a generally vertical member having upper and said lower ends, said generally vertical member lockably, releasably mountable on an upper surface of said sleeve at lower end, a generally horizontal member releasably mountable to said generally vertical member at said upper end of said generally vertical member, means for releasably locking an elongate object against said generally horizontal member, wherein said means for releasably locking said elongate object against said generally horizontal member comprises a slidable fame adapted for snug fitment around said generally horizontal member, said slidable frame adapted to forthsaid elongate object there-against and slidably positionable along said generally horizontal member, a selectively tensionable strap releasably mountable to said generally horizontal member extending along said generally horizontal member and positionable over said slidable frame, whereby said selectively tensionable strap may be selectively tensioned to releasably frictionally hold an elongate object against said slidable frame and to simultaneously releasably frictionally secure said slidable frame against said generally horizontal member, means for slidably lockably positioning said generally horizontal member on said upper end of said generally vertical member in releasably mountable engagement with said upper end, whereby said generally horizontal member is slidably lockably positionable on said upper end of said generally vertical member, wherein said means for slidably lockably positioning said generally horizontal member on said upper end further comprises means for releasably mounting said generally horizontal member in a first orientation longitudinally rearward of said vehicle and for releasably mounting said generally horizontal member in a second orientation transversely behind said vehicle, wherein said means for slidably lockably positioning said generally horizontal member on said upper end of said generally vertical member comprises a sleeve mounted to said upper end of said generally vertical member through which may be snugly journalled said generally horizontal member, and wherein said means for releasably mounting said generally horizontal member in a first orientation longitudinally rearward of said vehicle and for releasably mounting said generally horizontal member in a second orientation transversely behind said vehicle comprises first and second orthogonally aligned sleeves mounted to said upper end of said generally vertical member, each of said first and second sleeves sized to snugly receive said generally horizontal member when journalled therethrough.

27. An external rack for attachment to a vehicle, said vehicle having either a trailer hitch tube or a trailer hitch tongue, said trailer hitch tongue having a trailer ball mounted to a ball mounting aperture in said trailer hitch tongue, said external rack comprising:

a base releasably mountable on a vehicle, said base comprising a horizontally aligned sleeve adapted for snug sliding fitment over said trailer hitch tube, said sleeve having an aperture in a lower generally horizontal surface thereof for mounting of said sleeve to an upper horizontal surface of said trailer hitch tongue by means of fastening means, said sleeve mountable to said trailer hitch tongue mountable through said aperture in said lower surface of said sleeve through said ball mounting aperture in said trailer hitch tongue, a generally vertical member having upper and said lower ends, said generally vertical member lockably, releasably mountable on an upper surface of said sleeve at lower end, a generally horizontal member releasably mountable to said generally vertical member at said upper end of said generally vertical member, means for releasably locking an elongate object against said generally horizontal member, wherein said means for releasably locking said elongate object against said generally horizontal member comprises a slidable frame adapted for snug fitment around said generally horizontal member, said slidable frame adapted to forthsaid elongate object there-against and slidably positionable along said generally horizontal member, a selectively tensionable strap releasably mountable to said generally horizontal member extending along said generally horizontal member and positionable over said slidable frame, whereby said selectively tensionable strap may be selectively tensioned to releasably frictionally hold an elongate object against said slidable frame and to simultaneously releasably frictionally secure said slidable frame against said generally horizontal member, wherein said selectively tensionable strap is selectively tensionable by means of a ratchet mechanism mounted to said generally horizontal member.

28. An external rack for attachment to a vehicle, said vehicle having either a trailer hitch tube or a trailer hitch tongue, said trailer hitch tongue having a trailer ball mounted to a ball mounting aperture in said trailer hitch tongue, said external rack comprising:

a base releasably mountable on a vehicle, said base comprising a horizontally aligned sleeve adapted for snug sliding fitment over said trailer hitch tube, said sleeve having an aperture in a lower generally horizontal surface thereof for mounting of said sleeve to an upper horizontal surface of said trailer hitch tongue by means of fastening means, said sleeve mountable to said trailer hitch tongue mountable through said aperture in said lower surface of said sleeve through said ball mounting aperture in said trailer hitch tongue, a generally vertical member having upper and said lower ends, said generally vertical member lockably, releasably mountable on an upper surface of said sleeve at lower end, a generally horizontal member releasably mountable to said generally vertical member at said upper end of said generally vertical member, means for releasably locking an elongate object against said generally horizontal member, wherein said means for releasably locking said elongate object against said generally horizontal member comprises a slidable frame adapted for snug fitment around said generally horizontal member, said slidable frame adapted to forthsaid elongate object there-against and slidably positionable along said generally horizontal member, a selectively tensionable strap releasably mountable to said generally horizontal member extending along said generally horizontal member and positionable over said slidable frame, whereby said selectively tensionable strap may be selectively tensioned to releasably frictionally hold an elongate object against said slidable frame and to simultaneously releasably frictionally secure said slidable frame against said generally horizontal member, wherein said selectively tensionable strap comprises a resilient strap mounted to said generally horizontal member.

29. The device of claim 1 wherein said slidable frame comprises first and second G-shaped brackets, each of said G-shaped brackets having an upper horizontally extending arm, a longer member connecting one end of said upper horizontal arm to one end of a base member, a shorter member extending generally perpendicularly from an end of said base member opposed to said end of said base member connected to said longer member, said shorter member parallel to said longer member, said first and second G-shaped members mounted to each other so as to generally form an "X" when viewed from a first transverse direction, on said first G-shaped member an end of said shorter member opposed said base member mounted to said longer member on said second G-shaped member substantially mid-way along said longer member on said second G-shaped member, said first G-shaped member thus mounted to said second G-shaped member forming said "X" shape when viewed from said first transverse direction, said first G-shaped member when thus mounted to said second G-shaped member thereby forming a generally rectangular aperture therethrough, on said first and second G-shaped members, said upper horizontally extending arms, said longer members, said base members and said shorter members, when viewed from a second longitudinal direction orthogonal to said first transverse direction, said aperture sized to receive therethrough said generally horizontal member, said upper horizontally extending arm on said first G-shaped member and said upper horizontally extending arm on said second G-shaped member forming a transversely opposed pair of hooks when said first G-shaped member is mounted to said second G-shaped member, said slidable frame further comprising an elongate object supporting member mounted between said upper horizontally extending arm on said first G-shaped bracket and said upper horizontally extending arm on said second G-shaped bracket when said first and second G-shaped brackets are mounted to each other, whereby said selectively tensionable strap may be looped under said upper horizontally extending arm on said first G-shaped bracket and under said upper horizontally extending arm on said second G-shaped bracket so as to hold an elongate object supported against said elongate object support member and under said selectively tensionable strap.

30. The device of claim 29 wherein said upper horizontally extending arms on said first and second G-shaped brackets define generally, when said first and second G-shaped brackets are mounted together, a first plane and said elongate object support member supports an elongate object between said upper horizontally extending arms so as to intersect said first plane with said elongate object thereby requiring said selectively tensionable strap when hooked under said upper horizontally extending arms and over an elongate object supported in said elongate object support member, when said selectively tensionable strap is selectively tensioned, compresses an elongate object supported against said elongate object support member against said elongate object support member.

31. The device of claim 30 wherein said elongate object support member comprises sides extending from said elongate object support member beneath said first plane so as to extend to a position above said first plane on either side of an elongate object supported against said elongate object support member.

32. The device of claim 31 wherein said selectively tensionable strap is selectively tensionable by means of a ratchet mechanism mounted to said generally horizontal member.

33. The device of claim 31 wherein said selectively tensionable strap comprises a resilient strap mounted to said generally horizontal member.

* * * * *